United States Patent [19]

Kummer et al.

[11] Patent Number: 5,790,202
[45] Date of Patent: Aug. 4, 1998

[54] INTEGRATION OF OFF-AIR AND SATELLITE TV TUNERS IN A DIRECT BROADCAST SYSTEM

[75] Inventors: David A. Kummer, Highlands Ranch; Edmund F. Petruzzelli, Greenwood Village, both of Colo.

[73] Assignee: Echostar Communications Corporation, Englewood, Colo.

[21] Appl. No.: 772,031

[22] Filed: Dec. 19, 1996

Related U.S. Application Data

[60] Provisional application No. 60/017,706, May 15, 1995 and provisional application No. 60/019,079, Jun. 3, 1996.

[51] Int. Cl.$^6$ .................................................. H04N 5/44
[52] U.S. Cl. ........................... 348/553; 348/555; 348/569; 348/706; 348/725
[58] Field of Search .......................... 348/553, 554, 348/555, 556, 557, 558, 563, 569, 705, 706, 725, 728; H04N 5/44

[56] References Cited

U.S. PATENT DOCUMENTS

| | | |
|---|---|---|
| 4,675,732 | 6/1987 | Oleson . |
| 4,706,121 | 11/1987 | Young . |
| 4,743,968 | 5/1988 | Mogi . |
| 5,276,904 | 1/1994 | Mutzig . |
| 5,303,403 | 4/1994 | Leong . |

FOREIGN PATENT DOCUMENTS

0375467  6/1990  European Pat. Off. .

*Primary Examiner*—Sherrie Hsia
*Attorney, Agent, or Firm*—Pittenger & Smith, P.C.

[57] ABSTRACT

An improved system for the integration of off-air and satellite TV tuners in a direct broadcast system, comprising a source of an RF television signal, a TV tuner coupled to the RF signal source for demodulating the RF signal and producing baseband video and audio signals, a satellite antenna for receiving a data stream including direct broadcast satellite signals, a direct broadcast satellite tuner coupled to the satellite antenna for converting and demodulating the incoming signals to video and audio baseband output signals. An electronic program guide is included as part of the data stream received along with the direct broadcast satellite signals. A microprocessor is coupled to the direct broadcast satellite tuner for conditioning the electronic program guide. A multiplexer is coupled to the TV tuner, the broadcast satellite tuner, the electronic program guide and the microprocessor and is used to switch the signals and source so that an appropriate output signal can be directed to a display device for using the baseband video and audio signals. A controller is provided for the selection of the desired program channel from the guide and the automatic switching of the appropriate video and audio baseband signals and the signal source for the selected program. The user programs the zip code into the system for localizing the electronic programming guide used in the selection process.

21 Claims, 5 Drawing Sheets

INTEGRATION OF OFF-AIR AND SATELLITE TV TUNERS IN A DIRECT BROADCAST SYSTEM

This is a continuation of U. S. provisional patent application Ser. No. 60/017,706, filed May 15, 1995 for "INTEGRATION OF OFF-AIR AND SATELLITE TV TUNERS IN A DIRECT BROADCAST SYSTEM"; and U. S. provisional patent application Ser. No. 60/019,079, filed Jun. 3, 1996, for "INTEGRATION OF OFF-AIR AND SATELLITE TV TUNERS IN A DIRECT BROADCAST SYSTEM", both now pending.

FIELD OF THE INVENTION

This invention relates to improved integration and automatic input source selection of off-air and satellite TV tuners in a direct broadcast system. This invention further relates to an improved system providing superior video and audio input to a TV monitor from multiple sources. This invention also relates to an improved system providing for the incorporation of user-programmed information within the satellite receiver, e.g., the zip code for the location of the receiver so as to be able to process all the local programming information in a national electronic program guide.

BACKGROUND OF THE INVENTION

Figure 1:
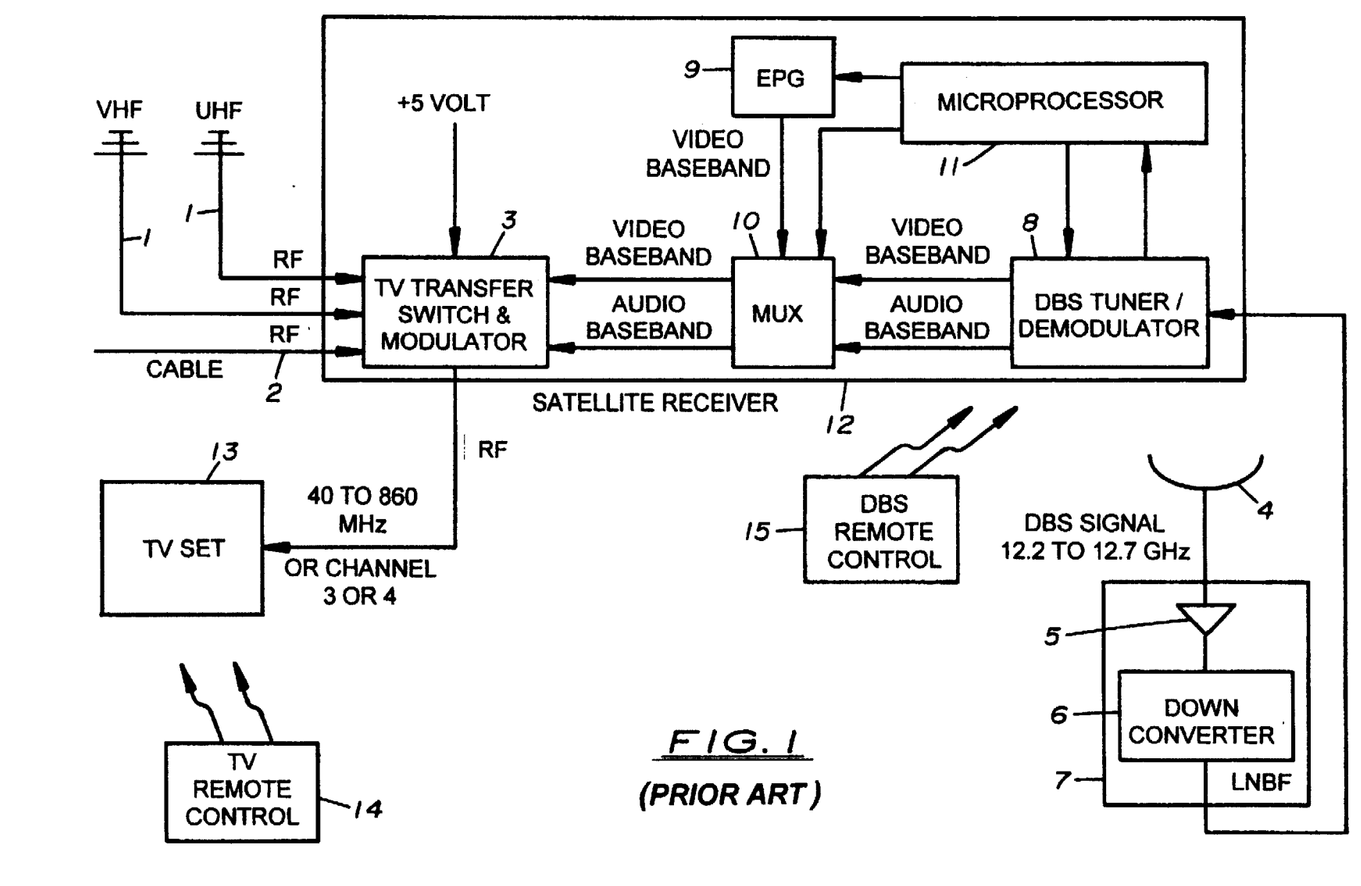
FIG. 1 is a schematic in block diagram form of a prior art system for the integration of off-air and satellite TV tuners in a direct broadcast system.

FIG. 1 illustrates the prior art, wherein radio frequency signals which are received by the VHF/UHF antennas 1 and/or cable 2 are fed directly to the TV transfer switch 3. The TV transfer switch 3 performs in two different modes. The first mode is a pass through mode for passing the RF signals from the VHF/UHF antennas 1 directly to the attached TV set 13. The second mode is a modulator mode which creates an RF carrier which typically has a frequency of Channel 3 or 4 and modulates the carrier with the output signals from a direct broadcast satellite source, which is then transferred directly to the TV set. The TV transfer switch 3 is an electronic switch that will perform the output signal selection from either of the two input signals.

Control voltage for the TV transfer switch 3 is provided as a +5 volt input from the satellite receiver power supply. The five volt input from the satellite receiver 12 provides the actuation of the TV transfer switch 3 by either the voltage being present or removed. The actual actuation function will be described later.

On the right side of FIG. 1, direct broadcast satellite (DBS) signals are received on a satellite antenna 4. These are relatively high powered signals received from the satellite which allows a parabolic antenna of approximately eighteen to thirty-six inches in diameter to be utilized as the antenna 4. Microwave frequencies in the range of 12.2 to 12.7 GHz are received by the satellite antenna. The preliminary satellite signal processing is accomplished in the low noise block converter feed (LNBF) provided in the antenna focal point. This includes a converter module 7 with a low noise amplifier 5 which receives the signals from the feed and by means of the down converter 6 converts the entire frequency band of the satellite downlink into a lower frequency range of approximately 0.95 to 2.15 Gigahertz which can be better carried by the coax cable input to the satellite receiver 12. In the satellite receiver 12 the signal is converted, decoded and demodulated to produce an output which is a baseband signal which is inputted into the multiplexer, or MUX 10. The baseband signal includes the video and audio signals. Another input into the MUX 10 is a baseband video signal only which emanates from the electronic program guide (EPG) section 9 which can be a module within the satellite receiver 12.

The EPG 9 is generated by the microprocessor 11 from the downlink data stream coming through the satellite. The incoming data stream includes the entire program schedule for each day and is converted into a text and schedule display through the microprocessor 11. As stated above, the signal coming out of the EPG 9 is a baseband video signal which is connected to the MUX 10.

The multiplexer 10 in this case is actually a switching device that switches the output between the two inputs to the device. Through the satellite receiver remote control 15, the microprocessor 11 causes the multiplexer 10 to be switched so that the output from the multiplexer 10 is either the baseband frequency of the selected viewing channel or the electronic program guide 9 which is to be displayed on the attached TV receiver 13.

In the prior art arrangement, the satellite receiver remote control 15 operates the entire television input system. The way this is accomplished is through the control of the +5 volts to the TV transfer switch 3. To actuate the switch 3, the satellite receiver 12 and tuner 8 are turned on by the DBS remote control 15 causing the five volt output to be applied to the TV transfer switch 3. When this occurs the switch 3 is automatically transferred to the modulator mode, so that an RF carrier is created and then modulated with the baseband signals and the output signals are transferred to the set through either channel 3 or 4. When the satellite receiver 12 and tuner 8 are turned "off" or placed in the "standby" mode, the voltage to the TV transfer switch 3 is removed, causing the switch 3 to automatically transfer to the pass through RF mode whereby the satellite baseband signals are cut off and the RF signals from the VHF/UHF antennas 1 and/or cable 2 and other sources are connected directly to the attached TV set 13. Thus, the consumer must physically turn "on" or "off" the satellite transfer circuit 12 in order to effectively connect the signals from the proper source to the attached TV set 13 in order to obtain the desired TV channel for viewing.

In this arrangement, the multiplexer 10 merely selects from a group of inputs the desired output to accomplish the desired function.

It is an object of the present invention to provide improved integration of off-air and satellite TV tuners in a direct broadcast system.

It is another object of the present invention to provide improved integration of off-air, cable and satellite TV tuners in a direct broadcast system.

Yet another object of this invention is to provide automatic input source selection through the use of the satellite receiver remote control.

It is a still further object of this invention to provide superior quality video and audio signals to a TV monitor.

It is another object of the present invention to provide an improved system for the incorporation of user-programmed information within the satellite receiver, e.g., the zip code for the location of the receiver so as to be able to process all the local programming information in the national electronic programming guide.

It is another object of the present invention to offer the consumer a source for providing the video and audio input signals that is transparent to him, merely requiring him to select the desired channel for viewing by means of the satellite receiver remote control, the channel being internally selected, tuned, and the source switched to provide viewing of the selected channel on the TV monitor.

These and other objects and advantages of the invention will be described more fully below.

INFORMATION DISCLOSURE STATEMENT SPECIFICATION AS MARKED

The following information is provided in compliance with the applicants' duty to disclose all pertinent information which is relevant to the subject of this application. The following patents are known to the applicants and are believed to be pertinent to the examination of this application.

The European patent application to Brian McDonald (Publication No. 0 375 467) discloses a control system for a satellite broadcast apparatus which comprises a television receiver which is capable of receiving signals from an off-air television antenna or from a satellite decoder. The television receiver includes a remote control system which receives a coded remote control signal from a hand held remote control unit. The remote control signal is decoded and processed by a microprocessor which controls the switching of the television receiver so as to receive signals either from the off-air antenna or the satellite decoder. In addition to this feature, the hand held remote control unit allows the selection of any one of the desired broadcast channels depending upon the RF source selected. In this arrangement the consumer must make the decision as to which program source will be switched and at the same time select the desired channel to be viewed. The applicants' arrangement is quite different in that the selection of the channel by the consumer automatically selects the viewing channel and the source for that specific channel. All switching is done transparent to the consumer without any human intervention.

The Oleson patent (U.S. Pat. No. 4,675,732) discloses a satellite TV system which includes a plurality of channel tuning strips and a control computer which in turn, controls the functioning of the individual channel strips. Each strip includes a tuner and a modulator wherein the tuner selects a particular satellite signal received and the modulator selects the particular television channel position on the individual television sets. The computerized control automatically switches the source of the incoming programing, depending upon the channel selected. This system of source selection is in no way similar to the arrangement which is presented in the present application.

The Mutzig et al patent (U.S. Pat. No. 5,276,904) discloses a multiple source arrangement for television reception. From the satellite antenna wide band demodulation is made possible by a microwave frequency source controlled by a synthesizer. A plurality of received signals are demodulated and processed by the receiving head in the satellite antenna which in turn, supplies signals which are remodulated in amplitude modulation and which are combined in a multiplexer with the terrestrial antenna signals for transmission through a single cable link to the television receiver. This patent is primarily intended for conditioning the incoming signals so that both the satellite as well as the off-air signals can be transmitted to the television set my means of a single coaxial cable.

The Leong patent (U.S. Pat. No. 5,303,403) discloses an electronic switch used in the low-noise block converter for receiving satellite horizontal and/or vertical polarization signals. The electronic switch requires a single wire to receive a pulse width signal from a TV receiver. The subject electronic switch outputs a high voltage level and a low voltage level according to the pulse width of the signal from the TV receiver to control the selection of the vertical or horizontal polarization signals. Although this patent describes the switching of the input satellite signals, it does it in an entirely different way than the source switching provided in the present application.

The Mogi et al patent (U.S. Pat. No. 4,743,968) discloses a system for controlling various electronics apparatus, such as television receivers, which has a control circuit operated by a program lodged in read-only memory to sequentially communicate with a plurality of operational circuit blocks forming the electronic apparatus. The control circuit selects a specific circuit block for data transfer upon a request signal. The request signal can be transmitted prior to a vertical blanking interval in a television signal, or by use of a dedicated line the signal can be transmitted at any time. A CPU is used for controlling the switching function of the circuits, but this is considerably different than the arrangement disclosed in the present invention.

The Young patent (U.S. Pat. No. 4,706,121) discloses a system for controlling a television receiver to allow user selection of broadcast programs from schedule information. The schedule information is processed through a microprocessor with the schedule displayed on the television screen. The user selects the desired channel from the displayed schedule which in turn, controls a programmable TV tuner which provides the desired broadcast signal for the selected program. There is no teaching in this patent of using the channel selection to control and switch the incoming source of the TV programming.

SUMMARY OF THE INVENTION

In accordance with the present invention, there is provided an improved system for the integration of off-air and satellite TV tuners in a direct broadcast system, comprising:

a. a source of an RF television signal;
b. a TV tuner coupled to the RF signal source for demodulating the RF signal and producing a baseband video and audio signal;
c. a satellite antenna for receiving direct broadcast satellite signals;
d. a low noise block converter coupled to the satellite antenna for converting the entire frequency band of the satellite downlink into a lower frequency range that can be better carried by a coaxial cable;
e. a direct broadcast satellite tuner coupled to the converter for converting and demodulating the incoming signal to a video and audio baseband output signal;
f. a microprocessor coupled to the direct broadcast satellite tuner for conditioning the data stream from the satellite;
g. an output device for displaying or otherwise using the baseband video and audio signals;
h. a multiplexer which is coupled to the TV tuner, the direct broadcast satellite tuner, the electronic program guide and the microprocessor and which is used to switch all of the signals being sent to an output device;
i. a satellite receiver comprised of the TV tuner (b), the direct broadcast satellite tuner (e), the microprocessor (f), and the multiplexer (h); and
j. a unified control for controlling the selection of video baseband and audio baseband signals from the RF signal source and from the satellite to be displayed on the output device.

We have found that a number of surprising benefits result from the improved system of the invention:

a. automatic input source selection through the use of the satellite receiver remote control,
b. superior quality video and audio signals are provided to a TV monitor,
c. the incorporation of user-programmed information within the satellite receiver, e.g., the zip code for the location of the receiver so as to be able to process and integrate all of the local programming information in the national electronic programming guide, and d. providing the consumer a source for protecting the video and audio input signals that is transparent to the user, merely requiring the user to select the desired channel for viewing by means of the satellite receiver remote control, the channel being internally selected, tuned, and the source switched to provide viewing of the selected channel on the TV monitor.

PREFERRED EMBODIMENTS OF THE INVENTION

Figure 2:
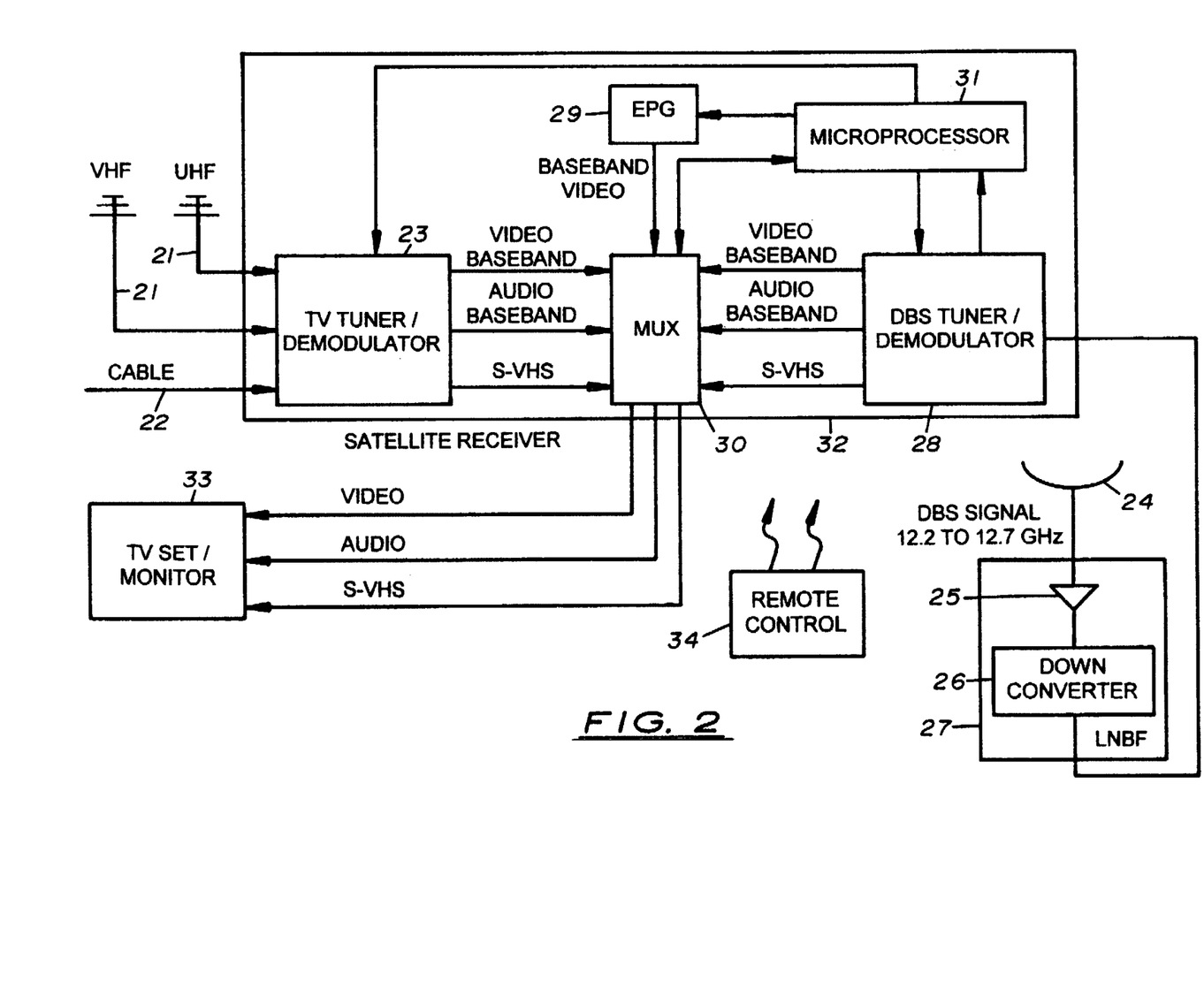
FIG. 2 is a schematic in block diagram form of a preferred embodiment of the invention for an improved system for the integration of off-air and satellite TV tuners in a direct broadcast system.

As shown in FIG. 2, it is preferred that the low noise block converter be coupled to the satellite antenna and positioned in the antenna feed horn. The low noise block converter includes a converter module with low noise amplifier that receives the direct broadcast signals from the feed and converts the entire frequency band of the satellite downlink into a lower or intermediate frequency (IF) range of 0.95 to 2.15 Gigahertz.

It is also preferred that the data stream from the satellite includes the subscribed electronic program guide, and combines it with user-programmed information within the satellite receiver, such as the zip code for the location of the receiver, and then selectively decodes the downlink data stream for the specific zip code location to integrate the local programming schedule with the standard national satellite programming schedule.

It is further preferred that the output device, such as a TV monitor or videotape recorder, is coupled directly to the multiplexer.

It is particularly preferred that a unified wireless remote control be used as the unified control for controlling the selection of video baseband and audio baseband signals from either the RF signal source or the satellite broadcast.

FIG. 2 illustrates one particularly preferred embodiment of the invention for an improved system for the integration of off-air and satellite TV tuners in a direct broadcast system. In the present invention, automatic input source selection is obtained through the use of the satellite receiver remote control. As illustrated in FIG. 2, an RF signal from the VHF/UHF off-air antennas 21 and/or an RF signal from an attached cable TV source 22 or HDTV source is connected directly into the input of a TV tuner module 23. The incoming RF signals are converted and demodulated and tuned to a particular selected channel and channel frequency. This signal is converted to a baseband video and audio signal which, in turn, is connected directly into a multiplexer, or MUX, 30.

The MUX 30 that is utilized in this embodiment is relatively different from the MUX 10 which was described in the prior art of FIG. 1. Although it still performs a switching arrangement, MUX 30 is used to switch all of the signals being sent to a TV monitor 33.

The direct broadcast satellite (DBS) tuner 28 receives the signal directly from the satellite antenna 24 and the LNBF 27 as previously described. The LNBF includes a converter module 26 with a low noise amplifier 25 which receives the signals from the feed horn and by means of the down converter 26 converts the entire frequency band of the satellite downlink into a lower or intermediate frequency range of 0.95 to 2.15 Gigahertz which can be better carried by the coax cable input to the satellite receiver 32. The satellite receiver 32 converts and demodulates the incoming signal to a video and audio baseband output signal. The desired TV channel is tuned within the tuner 28 for the desired channel that is selected. The resulting baseband video and audio signals are connected directly to the multiplexer (MUX) 30, the same as the TV tuner 23 which is connected to the VHF/UHF 21 antennas and cable TV inputs 22.

As described previously, the electronic program guide (EPG) 29 is also connected to the MUX 30 and provides a baseband video signal.

The data stream being received from the satellite, which includes the subscribed EPG 29 is conditioned by the microprocessor 31 and combined with user programmed information within the satellite receiver 32, such as the zip code for the location of the receiver 32. The microprocessor 31 then selectively conditions the downlink data stream for the specific zip code location to integrate the local programming schedule with the standard national satellite programming schedule. Thus, the EPG 29 provides complete scheduling for all local as well as satellite channels and the time periods for the available programs. This ability to process the total data stream received from the satellite which contains all of the local programming information for the entire country is an important feature of this invention.

All inputs to the MUX 30 are baseband video and audio inputs. The MUX 30 is designed to switch one of the incoming baseband groups to the input of a TV monitor 33. It is important to note that, in this invention the novelty of this system is the ability to automatically output the higher quality baseband video and audio signals directly to the television baseband inputs which allows the TV set to be used as a TV monitor 33. It is also to be understood that the output video signal coming from the TV tuner module 23 as well as the DBS tuner module 28 can be S-VHS signal inputs which are switched by the multiplexer 30 and directed to the S-VHS input of the TV monitor 33.

In operation, the satellite receiver remote control 34 is utilized to call up the electronic program guide 29 which is conditioned by the microprocessor and then displayed directly on the TV monitor 33. Through the remote control 34 or the satellite receiver control buttons a desired channel can be selected from the EPG display and actuated. The satellite receiver microprocessor 31 recognizes the channel number selected and accordingly, tunes the respective tuner 23 or 28 to the selected channel and then switches the multiplexer 30 to direct the input from the selected tuner to the output of the satellite receiver 32 and the input to the TV monitor 33. At the present time, the microprocessor 31 through the provided software selects the proper tuner 23 or 28 and input by recognizing whether the selected channel is a two digit or three digit number. The two digit numbers include the local channels which are received "off-air" and the cable TV channels. The three digit numbers correlate with the satellite channel designations and thus, all of these channels are provided through the DBS tuner 28.

It is to be understood that while source selection has been described as being effected by digit recognition, any other type of channel and thus, source selection can be used which will provide the desired result. Other types of selection criteria may be network station designations, program titles, or network icons. These criteria are then set-up individually as to program input source and stored in memory. As a selection is made the processor and multiplexer switch the appropriate source for the program desired.

In this invention, higher quality video and audio signals are inputted directly into a TV monitor for superior picture and sound quality. The source for providing the video and audio input signals is transparent to the consumer who merely selects the desired channel for viewing through the satellite receiver remote control with the channel internally selected, tuned and the source switched to provide for viewing of the selected channel on the TV monitor.

Although it would be possible to modulate and create an RF carrier for Channels 3 or 4 from the baseband signals at the MUX, the reconversion of these signals to radio frequency for use as an input to a standard TV set would somewhat defeat one of the primary benefits of the present invention in providing high quality video and audio signals for viewing through a TV monitor. As a result, the present invention provides substantially improved quality in the pictures displayed and viewed by the consumer, regardless of RF input source.

Throughout this application reference has been made to the combining of a digital satellite input stream with off-air or cable RF signals for the purpose of switching the source of the programming depending upon the channel or source selected by the user. It is also to be understood that although reference has been made to combining these signals with a digital satellite input signal, the actual critical consideration is intended to be the fact that a digital input signal is provided. This is to say, that this invention can automatically select and switch the source of programing input from any digital network interface module, such as a satellite transmission signal, HDTV signals, digital telephony, digital microwave or RF transmission and digital cable TV signals with any other source. Thus, the cable TV off-air and cable TV RF sources can be switched with any digital source where multiple input sources are to be provided to a display, such as a TV monitor. The critical ability of the present invention is to be able to automatically switch these sources, depending upon any channel or input source selection made by the user.

Figure 3:
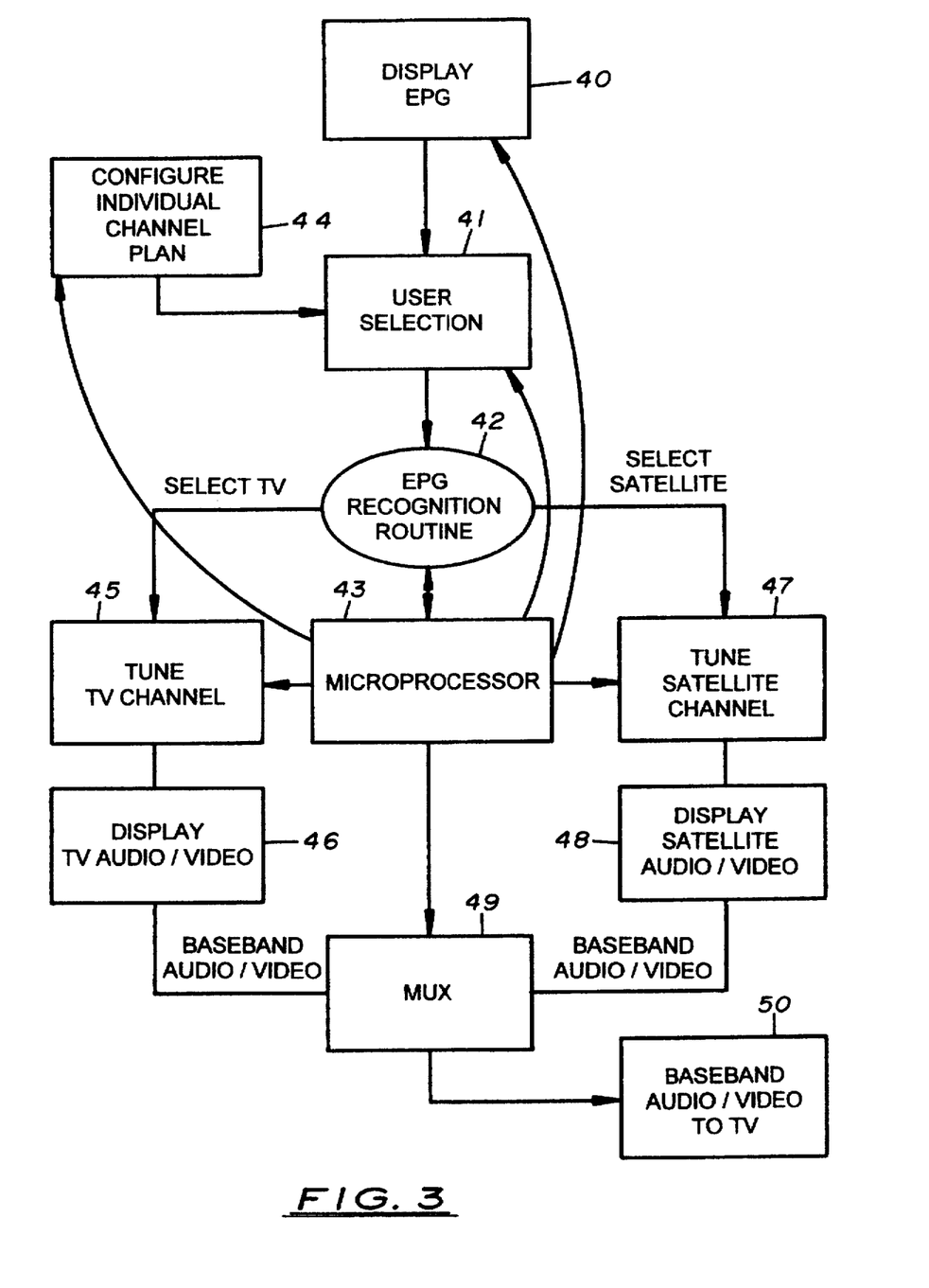
FIG. 3 is a block diagram showing the microprocessor inputs and outputs in receiving the EPG information and providing the complete schedule from the electronic program guide to the TV monitor.
Figure 5:
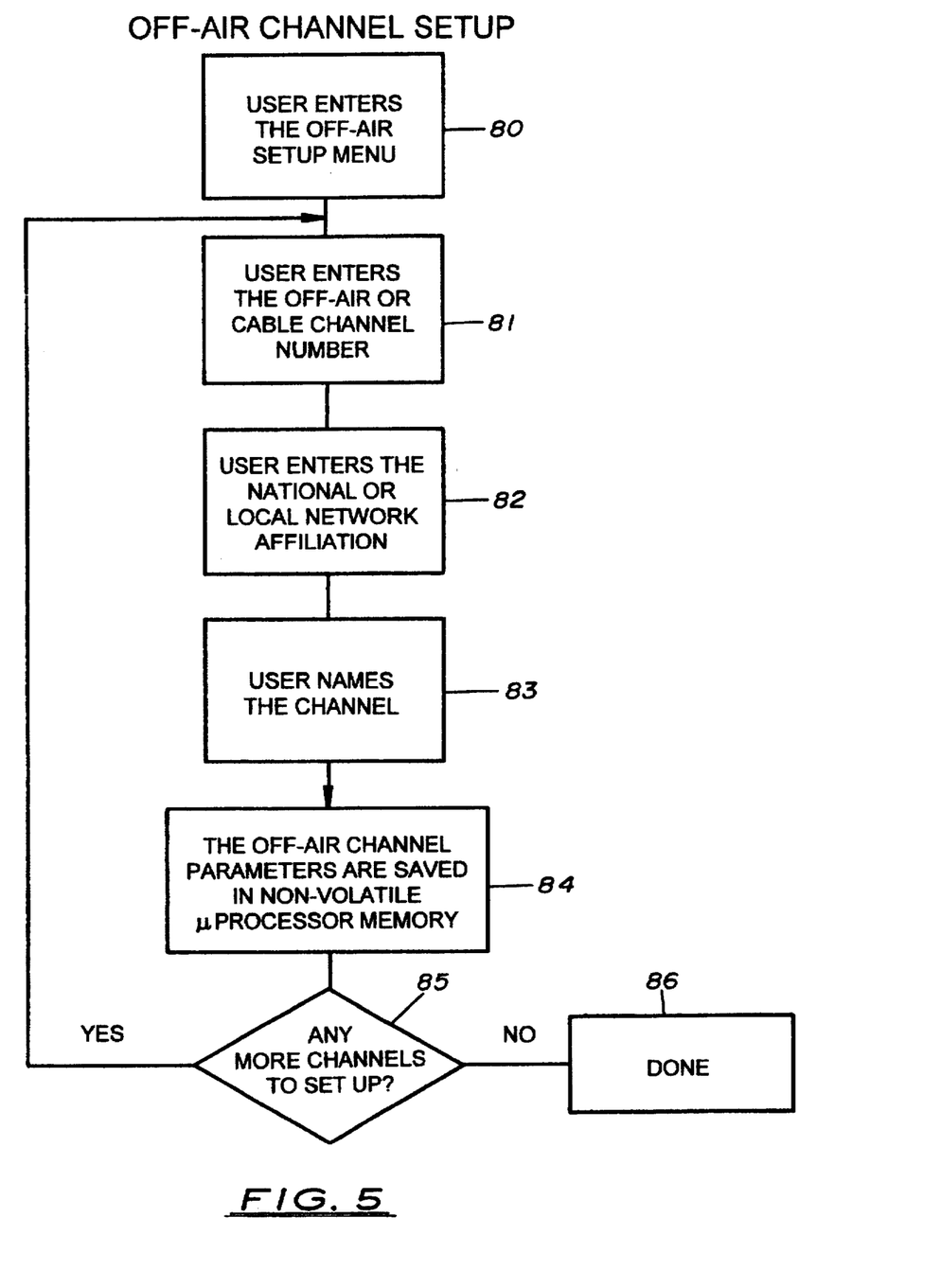
FIG. 5 is a logic diagram showing the steps involved in setting up the off-air channels.

FIG. 3 is a block diagram showing the microprocessor inputs and outputs in receiving the EPG information and providing the complete schedule from the electronic program guide to the TV monitor. As illustrated in FIG. 3, the electronic programming guide is displayed in block 40, displaying data provided by the microprocessor shown in block 43. Using the information in the display 40, the user selects the channels desired as shown in block 41 based on information provided by microprocessor 43. The microprocessor 43 also provides information so that the user can configure his individual channel plan as shown in block 44. The individual channel plan is set up as illustrated in FIG. 5. The users's selection is conveyed to the EPG recognition routine shown in block 42. Then, depending upon whether the channel selected contains 2 digits (TV) or three digits (satellite), the EPG recognition routine 42 determines the branching to either the TV or satellite tuning circuits. If the selected channel has two digits then the microprocessor 43 tunes the TV channel as shown in block 45, thereby displaying TV audio and video as shown in block 46. If the selected channel has three digits, then the microprocessor 43 tunes the satellite channel as shown in block 47, thereby displaying satellite audio and video as shown in block 48. In each case, the signals that emanate from blocks 46 and 48 are in the form of baseband audio/video signals. The baseband audio/video signals are then fed to the MUX shown in block 49, which under the control of the microprocessor 43 provides a combined TV and satellite baseband audio/video signals to the TV monitor as shown in block 50.

Figure 4:
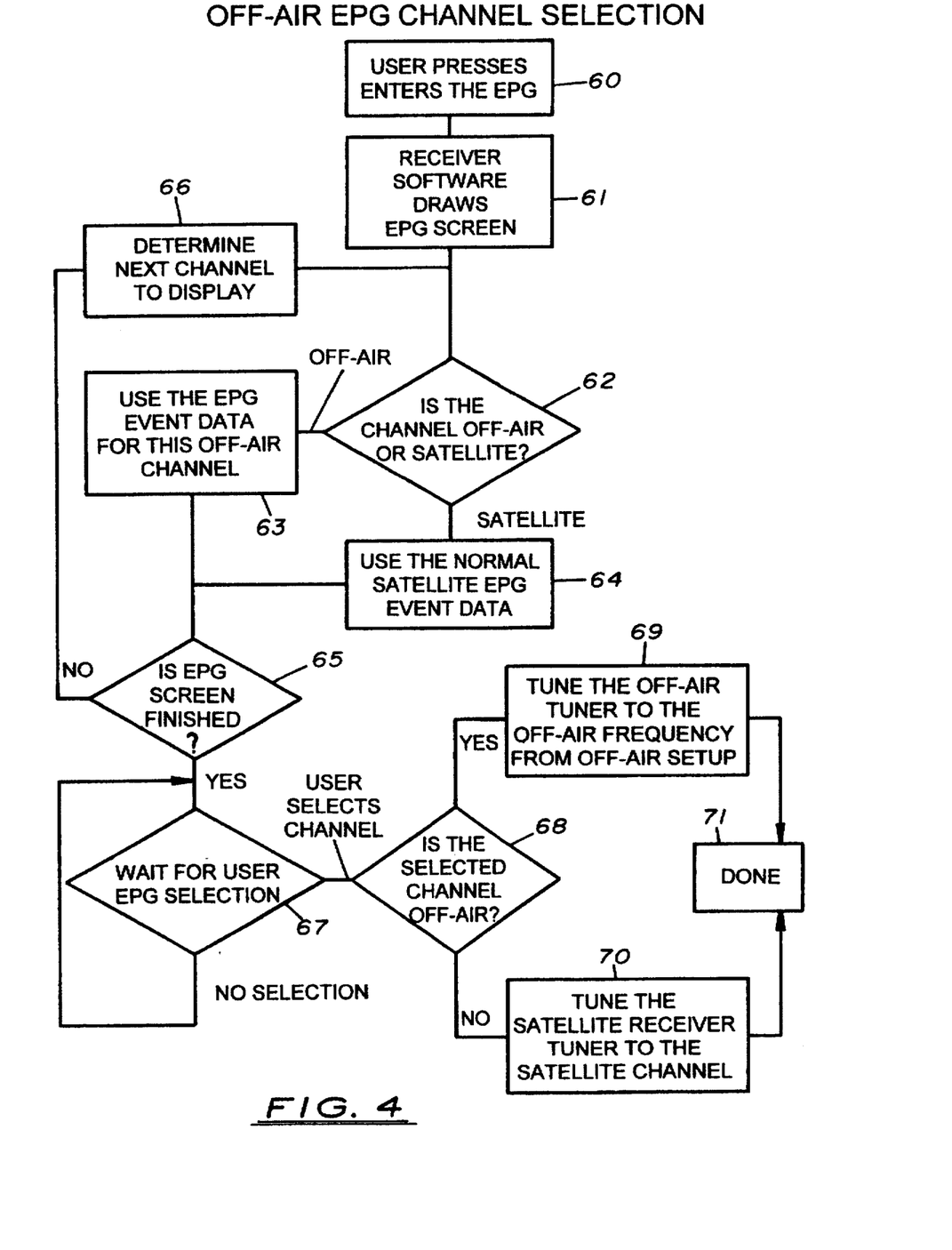
FIG. 4 is a logic diagram showing the steps involved with the microprocessor controlling the selection of the correct channel in either the TV tuner or the direct broadcast satellite tuner and the switching of the multiplexer to provide the required output.

FIG. 4 is a logic diagram showing the steps involved with the microprocessor controlling the selection of the correct channel in either the TV tuner or the direct broadcast satellite tuner and the switching of the multiplexer to provide the required output. As illustrated in FIG. 4, the user presses the control key and enters the electronic program guide as shown in block 60. Then the receiver software causes the EPG screen to be drawn as shown in block 61. The user is then presented with the question shown in block 62, "Is the channel off-air or satellite?" If the channel selected by the user is off-air, then the system uses the EPG event data for the off-air channel as shown in block 63. If the channel selected by the user is from the satellite, then the system uses the normal satellite EPG event data as shown in block 64. The user is then presented with the question shown in block 65, "Is the EPG screen finished?" If the answer to the question is "no," then the user is presented with the request to determine the next channel to display as shown in block 66. The system then recycles to blocks 62, 63 and 64 until the answer to the question posed in block 65 is "yes." As shown in block 67, the system then waits for the user to make an EPG selection. If there is no selection, the system recycles until the answer is "yes." When the user has made his selection, he is then presented with the question shown in block 68, "Is the selected channel off-air?" If the answer to the question is "yes, then as shown in block 69 the off-air tuner is tuned to the off-air frequency from the off-air setup. The off-air setup is shown in more detail in FIG. 5. If the answer to the question is "no," then as shown in block 70 the satellite receiver tuner is tuned to the satellite channel. In either event, the process is completed as shown in block 71.

FIG. 5 is a logic diagram showing the steps involved in setting up the off-air channels. As illustrated in FIG. 5, the user enters the off-air setup menu as shown in block 80. The user enters either the off-air or cable channel number as shown in block 81. Next the user enters the national or local network affiliation as shown in block 82. Then in block 83 the user names the channel. All the off-air channel parameters entered in the previous steps are saved in non-volatile microprocessor memory as shown in block 84. Then as shown in block 85, the user is presented with the question, "Are there any more channels to set up?" If the answer to the question is "yes," then the system recycles through the steps 81, 82, 83 and 84 for as many additional times as are required for the answer to the question in block 85 to be answered "no," in which case the system is done as shown in block 86.

It is to be understood that while portions of the input source have been designated as "off-air TV" and "cable TV"

radio frequency sources, it is possible that any RF or baseband input source could be substituted for the described and illustrated sources. These substitute sources could be network interface modules, such as HDTV and cable TV tuners, and VCR's and laser disc drives.

Although illustrative embodiments of the invention have been described in detail herein with reference to the accompanying drawings, it is to be understood that the invention is not limited to such precise embodiments and that various changes and modifications can be effected therein by one skilled in the art without departing from the spirit and scope of the invention, as defined in the appended claims.

What is claimed is:

1. An improved system for the integration of off-air and satellite TV tuners in a direct broadcast satellite system, comprising:
   a) a source of an RF television signal;
   b) a TV tuner coupled to the RF television signal source for demodulating the RF television signal;
   c) a satellite antenna for receiving a data stream from a satellite consisting of direct broadcast satellite signals and an electronic program guide;
   d) a direct broadcast satellite tuner coupled to the satellite antenna for converting and demodulating the incoming satellite data stream;
   e) a microprocessor coupled to the direct broadcast satellite tuner for conditioning the electronic program guide from the satellite data stream;
   f) an output device for displaying or otherwise using signals from the TV tuner and the satellite tuner;
   g) a multiplexer which is coupled to the TV tuner, the direct broadcast satellite tuner, the electronic program guide, and the output device, the multiplexer being arranged to switch all of signals being sent to the output device; and
   h) a unified control means for controlling the selection of signals from the RF television signal source and from the satellite antenna to be displayed on the output device.

2. An improved system as defined in claim 1 wherein a satellite receiver means includes the TV tuner, the direct broadcast satellite tuner, the microprocessor, and the multiplexer.

3. An improved system as defined in claim 1 wherein the RF television signal source is provided by a VHF or UHF off-air antenna or by a cable signal provider.

4. An improved system as defined in claim 1 wherein the electronic program guide includes national and local programing schedules, and the microprocessor combines the electronic program guide with user-programmed information for identifying the location of the system and selects the applicable portions of the electronic program guide to integrate the local programming schedule with standard national satellite programming schedule on the output device.

5. An improved system as defined in claim 1 wherein a wireless remote control is used as the control means for controlling the selection of signals from either the RF television signal source or the satellite antenna.

6. An improved system for the integration of off-air and satellite TV tuners in a direct broadcast system, comprising:
   a) a source of an RF television signal;
   b) a TV tuner coupled to the RF television signal source for demodulating the RF television signal and producing a baseband video and audio output signal;
   c) a satellite antenna for receiving a data stream from a satellite consisting of direct broadcast satellite signals and an electronic program guide;
   d) a low noise block converter coupled to the satellite antenna for converting the entire frequency band of the satellite data stream into a lower frequency range that can be better carried by a coaxial cable;
   e) a direct broadcast satellite tuner coupled to the converter for converting and demodulating an incoming signal to a video and audio baseband output signal;
   f) a microprocessor coupled to the direct broadcast satellite tuner for conditioning the electronic program guide from the satellite data stream;
   g) an output device for displaying or otherwise using the baseband video and audio output signals;
   h) a multiplexer which is coupled to the TV tuner, the direct broadcast satellite tuner, the electronic program guide and the output device and which is used to switch all of received signals being sent to the output device; and
   i) a unified control means for controlling the selection of video baseband and audio baseband signals from the RF television signal source and from the satellite antenna to be displayed on the output device.

7. An improved system as defined in claim 6 which further includes a satellite receiver comprised of the TV tuner, the direct broadcast satellite tuner, the microprocessor, and the multiplexer.

8. An improved system as defined in claim 6 wherein the RF signal source is provided by a VHF or UHF off-air antenna or by a cable signal provider.

9. An improved system as defined in claim 6 wherein the low noise block converter includes a converter module having a low noise amplifier and converter that receives the direct broadcast satellite signals and converts the entire frequency band of the satellite data stream into the lower frequency range of approximately 0.95 to 2.15 Gigahertz.

10. An improved system as defined in claim 6 wherein the electronic program guide includes national and local programing schedules, and the microprocessor combines the electronic program guide with user-programmed zip code information for identifying the location of the system, and selects the applicable portions of the electronic program guide to integrate the local programming schedule with a standard national satellite programming schedule on the output device.

11. An improved system as defined in claim 6 wherein the output device is a TV monitor or videotape recorder.

12. An improved system as defined in claim 6 wherein a wireless remote control is used as the control means for controlling the selection of video baseband and audio baseband signals from either the RF television signal source or the satellite antenna.

13. A method for integrating off-air and satellite TV tuners in a direct broadcast system, the method comprising the steps of:
   a) receiving RF television signals;
   b) tuning and demodulating the RF television signals and producing video and audio output signals;
   c) receiving a data stream from a satellite downlink consisting of direct broadcast satellite signals and electronic program guide signals;
   d) converting and demodulating the incoming direct broadcast satellite signals to video and audio output signals;
   e) processing and conditioning the electronic program guide signals and outputting the conditioned signals to an output device for displaying or using the signals; and f) selecting a desired program from said electronic program guide signals and switching the signals from either the satellite direct broadcast signals or the RF television signals for display on the output device.

14. A method of integrating off-air and satellite TV tuner in a direct broadcast system as described in claim 13 which further includes a step of remotely controlling the selection of the program and automatically switching the appropriate signal to the output device.

15. A method for integrating off-air and satellite TV tuners in a direct broadcast system as described in claim 13 which further includes the step of converting and demodulating incoming signals from the RF television signals or the satellite data stream signals to video and audio baseband output signals for display on a TV monitor output device.

16. An improved system for the integration of multiple programming sources in a television receiving system, comprising:

a) a source of an RF analog television signal;

b) a TV tuner coupled to the RF analog television signal source for demodulating the RF analog television signal;

c) a digital network interface module source for receiving a digital datastream consisting of video and audio signals;

d) an electronic program guide data source;

e) a suitable tuner coupled to the digital network interface module source for converting and demodulating the incoming audio and video datastream;

f) a microprocessor coupled to the electronic program guide data source for conditioning an electronic program guide and directing the selection of an appropriate program source depending upon an program selected;

g) an output device for displaying or otherwise using signals from the TV tuner and the suitable tuner;

h) a multiplexer which is coupled to the TV tuner, the suitable tuner, the electronic program guide data source, and the output device, the multiplexer being arranged to switch all of the signals being sent to the output device; and i) a unified control means for controlling the switching of selected signals from the RF analog television signal source and the digital network interface module source to be displayed on the output device.

17. An improved system as defined in claim 16 wherein the TV tuner, the digital network interface module source, the microprocessor and the multiplexer are connected within a receiver means.

18. An improved system as defined in claim 16 wherein the RF analog television signal source is provided by a VHF or UHF off-air antenna or by a cable signal provider.

19. An improved system as defined in claim 16 wherein the electronic program guide includes national and local programming schedules, and the microprocessor combines the electronic program guide with user-programed information for identifying the location of the system and selects the applicable portions of the electronic program guide to integrate the local programming schedule with standard national satellite program schedules on the output device.

20. An improved system as defined in claim 16 wherein a wireless remote control is used as the control means for controlling a selection of input signals.

21. An improved system as defined in claim 16 wherein the digital network interface module source incorporates an input from a HDTV source or other digital cable, telephony or microwave input source.

* * * * *